United States Patent
Zhen et al.

(10) Patent No.: US 7,848,286 B2
(45) Date of Patent: Dec. 7, 2010

(54) WIRELESS LOCAL AREA NETWORK (WLAN) AND CHANNEL SELECTION METHOD OF WLAN STATION

(75) Inventors: Jiang Zhen, Suwon-si (KR);
Myeon-Kee Youn, Incheon (KR);
Seong-Joon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1039 days.

(21) Appl. No.: 11/544,642

(22) Filed: Oct. 10, 2006

(65) Prior Publication Data
US 2007/0115877 A1  May 24, 2007

(30) Foreign Application Priority Data
Nov. 24, 2005  (KR) ............... 10-2005-0113112

(51) Int. Cl.
*H04L 12/22*  (2006.01)
*H04L 12/28*  (2006.01)
*H04L 12/56*  (2006.01)

(52) U.S. Cl. ............... 370/329; 370/328; 370/338; 455/450; 455/455

(58) Field of Classification Search ............... None
See application file for complete search history.

(56) References Cited

U.S. PATENT DOCUMENTS

| | | | |
|---|---|---|---|
| 7,468,951 B2* | 12/2008 | Qian et al. ............... | 370/252 |
| 2003/0169716 A1* | 9/2003 | Saito ............... | 370/338 |
| 2004/0264413 A1* | 12/2004 | Kaidar et al. ............... | 370/332 |
| 2005/0068928 A1* | 3/2005 | Smith et al. ............... | 370/338 |
| 2006/0111103 A1* | 5/2006 | Jeong et al. ............... | 455/434 |
| 2007/0165537 A1* | 7/2007 | Magnusson et al. ............... | 370/254 |
| 2007/0184831 A1* | 8/2007 | Morimoto ............... | 455/432.1 |

* cited by examiner

*Primary Examiner*—Rafael Pérez-Gutiérrez
*Assistant Examiner*—Frank Donado
(74) *Attorney, Agent, or Firm*—H.C. Park & Associates, PLC

(57) ABSTRACT

In a wireless local area network (WLAN) and a channel selection method of a WLAN station, a station newly entering the WLAN captures packets from WLAN service channels, which packets are provided by at least one access point (AP) for a predetermined measuring time. The WLAN calculates, from the captured packets, busy factors indicative of the load on each WLAN service channel so as to confer a priority between WLAN service channels. The WLAN selects channels according to the conferred priority.

12 Claims, 7 Drawing Sheets

WIRELESS LOCAL AREA NETWORK (WLAN) AND CHANNEL SELECTION METHOD OF WLAN STATION

CLAIM OF PRIORITY

This application makes reference to, incorporates the same herein, and claims all benefits accruing under 35 U.S.C.§119 from an application for WIRELESS LAN NETWORK AND CHANNEL SELECTION METHOD OF WLAN STATION earlier filed in the Korean Intellectual Property Office on the 24 of Nov. 2005 and there duly assigned Serial No. 10-2005-0113112.

BACKGROUND OF THE INVENTION

1. Technical Field

The present invention relates to a wireless local area network (WLAN) network and a channel selection method of a WLAN station, and more particularly to a channel selection method of a WLAN station in which a station entering a WLAN service area determines an access channel in consideration of the load of each service channel provided from at least one access point (AP).

2. Related Art

A wireless local area network (WLAN) is also referred to as Wi-Fi, meaning that it makes the wireless network convenient to use like a Hi-Fi audio component. Personal digital assistants (PDAs) or notebook computers can use very high speed Internet within a specific area about an access point (AP). In this case, the PDAs or notebook computers do not require a telephone line or a private line because they use radio frequency, but they require a WLAN card.

Although the WLAN was initially industrialized in the late 1980s by wireless appliance manufacturers such as Proxim, Symbol and so on, it could not have become generalized because many types of formats there of were jumbled up. However, it has developed rapidly after the Wireless Ethernet Capability Alliance (WECA), which was changed into WiFi in 2002, assigned WiFi authentication in September 1999 to products compatible with a standard, IEEE 802.11b, that the WECA had proposed. It was introduced into the Republic Of Korea in 2000, and has been activated in universities and companies.

IEEE 802.11 WLAN initially supported a data transfer rate of 2 Mbps using 2.4 GHz band, but with the determination of a physical layer standard for IEEE 802.11b and IEEE 802.11a in 1999, IEEE 801.11b supported a data transfer rate of 11 Mbps in the 2.4 GHz band and IEEE 802.11a supported a data transfer rate of 54 Mbps in the 5 GHz band. In particular, IEEE 802.11a adopted Orthogonal Frequency Division Multiplexing (OFDM) with 52 sub-carriers in order to obtain a high transfer rate, so that it had a strong advantage against multi-route interference because of simple equalization. Then, IEEE 802.11g as a high speed transfer standard for 2.4 GHz band was completed, and it adopted a Complementary Code Keying-OFDM (CCK-OFDM) as a compulsory transfer manner for interoperating with the IEEE 802.1b.

There are two modes of configuring WLAN. One is an ad-hoc mode, and the other is an infrastructure mode. The ad-hoc mode is a mode in which a local area network (LAN) is configured by wireless appliances only without a central controller or access points. The respective wireless appliances communicate directly with other appliances without a central controller. This is advantageous in the case where there is no need for microcomputers to be gathered together at one place in order to communicate with other networks.

Conversely, the infrastructure mode is one in which access points (APs) are configured to expand the existing cable LAN into a wireless device. The APs function as a central controller of the WLAN by connecting the wire and WLANs together. The APs control transmitting and receiving between the plurality of wireless devices within a specified area. Even in the case of a hot spot environment, wherein many users gather in crowds within a restricted space, the infrastructure mode is mostly adopted as a base mode. In the infrastructure mode for 802.11 WLAN communications, a station (laptop, smart device, and so on) first checks the connectable AP and network in such a way that it monitors a 'beacon' frame which generates a signal by which the AP reports its existence, or it probes a specified network using a 'probe' frame.

A channel selection algorithm scans a given channel set from its lowest channel to its highest channel in such a manner that it selects the fastest channel which is now serviced by an AP, or the channel with the highest received signal strength indication (RSSI) by scanning all of the channels. This procedure is implemented whenever a new station has access, and continues until the number of stations exceeds the maximum number that one AP can control, so that the corresponding station cannot control more stations. In this case, the next access station is brought over to the AP which services the next channel.

The network load or traffic between APs should be maintained properly in order to provide services to as many stations as possible, and to maintain good service quality as well. To this end, it is required that the mobile station select the AP with least load before it actually has access to the WLAN system. However, as seen before, it is difficult for the presently used algorithm to realize this.

Thus, there is a need for a channel selection method which can properly distribute a network load over the respective APs, and which can provide good service quality as well.

SUMMARY OF THE INVENTION

It is, therefore, an object of the present invention to provide a wireless local area network (WLAN) and a channel selection method of a WLAN station which determine a channel to be accessed by checking the load of a WLAN channel which a WLAN station receives.

To achieve the above and other objects, in accordance with an aspect of the present invention, a channel selection method of a WLAN station comprises the steps of: capturing, at a station newly entering a WLAN, packets from all WLAN service channels which are provided by at least one access point (AP) for a predetermined measuring time; and calculating, from the captured packets, busy factors indicative of the load on each WLAN channel so as to confer a priority between channels, and selecting the channels according to the conferred priority.

The step of capturing packets preferably comprises: setting a data rate according to information included in a beacon frame received from at least one AP; setting a clear channel assessment (CCA) interval which is a busy measuring time unit for each channel, and a monitoring period for repeated measurement; and capturing all of the received packets irrespective of destination addresses included in the packets received during the set monitoring period.

The step of selecting the channel according to the priority preferably comprises: sorting the obtained packets by channel; calculating busy factors by channel from a mean value of an interval ratio which is channel-busy indicator within each CCA interval in the monitoring period; and conferring a priority between channels according to the calculated busy factors by channel.

The step of selecting the channel according to the priority preferably comprises: sorting the captured packets by channel; checking destination address fields and source address fields included in the packets by channel to calculate the numbers of stations held by the respective channels; calculating busy factors by channel from a mean value of an interval ratio which is channel-busy indicator within each CCA interval in the set monitoring period; and conferring a priority between channels according to the calculated busy factors by channel in such a way that, if the difference between busy factors is less than a predetermined reference value, a priority is conferred upon the channel holding less stations than others by comparing the number of stations held by the respective channels.

The busy factor is calculated by the following equation:

$$BusyFactor = \frac{T_{cca\_interval}}{T_{monitoring\_period}} \times \sum_{i=0}^{T_{monitoring\_period}/T_{cca\_interval}} \frac{Ti_{cca=1}}{T_{cca\_interval}} \times 100\%$$

wherein, $T_{cca\_interval}$ denotes the CCA interval, $T_{monitoring\_period}$ denotes the monitoring period, and $Ti_{cca=1}$ means that CCA by the respective CCA intervals is 1.

The step of calculating the numbers of stations preferably comprises determining the number of destinations included in the destination address fields of multicast packets transmitted to all stations held by the corresponding AP from APs servicing the respective channels so as to calculate the number of stations held by each channel.

The channel selection method of the WLAN station preferably further comprises: scanning one channel, from the lowest channel to the highest channel, in the WLAN; and making a probe channel list configured by channels being serviced by the AP.

The channel selection method of the WLAN station preferably further comprises: transmitting an authentication request to the AP servicing channels according to a priority conferred between the channels; and, if the authentication request is successful, transmitting an association request to the AP.

In an embodiment of the present invention, an access channel selection method of a station comprises: setting a data rate according to information included in a beacon frame received from at least one AP; setting a clear channel assessment (CCA) interval which is a busy measuring time unit for each channel, and a monitoring period for repeated measurement; capturing all of the received packets irrespective of destination addresses included in the packets received during the set monitoring period; sorting the captured packets by channel; calculating busy factors by channel from a mean value of interval ratio which is a channel-busy indicator within each CCA interval in the monitoring period; and conferring a priority between channels according to the calculated busy factors by channel.

In an embodiment of the present invention, an access channel selection method of a station comprises: setting a data rate according to information included in a beacon frame received from at least one AP; setting a clear channel assessment (CCA) interval which is a busy measuring time unit for each channel, and a monitoring period for repeated measurement; capturing all of the received packets irrespective of destination addresses included in the packets received during the set monitoring period; sorting the captured packets by channel; checking destination address fields and source address fields included in the packets by channel so as to calculate the numbers of stations held by the respective channels; calculating busy factors by channel from the mean value of interval ratio which is channel-busy indicator within each CCA interval in the set monitoring period; and conferring a priority between channels according to the calculated busy factors by channel in such a way that, if the difference between busy factors is less than a predetermined reference value, a priority is conferred upon the channel holding less stations than others by comparing the numbers of stations held by the respective channels.

In another aspect of the present invention, a WLAN station which, when newly entering a WLAN including at least one access point (AP), captures packets from all WLAN service channels provided by at least one AP for a predetermined measuring time, and which calculates, from the captured packets, busy factors indicative of the load on each WLAN channel so as to confer a priority between channels, and which selects the channels according to the conferred priority.

The capturing of packets preferably comprises: setting a clear channel assessment (CCA) interval which is a busy measuring time unit for each channel, and a monitoring period for repeated measurement; and capturing all of the received packets, irrespective of destination addresses, included in the packets received during the monitoring period.

The conferring of a priority between the channels preferably comprises: sorting the captured packets by channel; calculating busy factors by channel from a mean value of an interval ratio which is channel-busy indicator within each CCA interval in the monitoring period; and conferring a priority between channels according to the calculated busy factors by channel.

The conferring of a priority between the channels preferably comprises: sorting the captured packets by channel; calculating busy factors by channel from a mean value of an interval ratio which is channel-busy indicator within each CCA interval in the monitoring period; checking destination address fields and source address fields included in the packets by channel to calculate the numbers of stations held by the respective channels; and conferring a priority between channels according to the calculated busy factors by channel in such a way that, if the difference between busy factors is less than a predetermined reference value, a priority is conferred upon the channel holding less stations than others by comparing the numbers of stations held by the respective channels.

In yet another aspect of the present invention, a WLAN comprises: at least one access point (AP) for determining to allow an association request according to its accommodation capacity when receiving the association request; and a station which, when newly entering the WLAN, captures packets from all WLAN service channels provided by at least one AP for a predetermined monitoring period, calculates from the captured packets busy factors to confer a priority between channels, determines access channel according to the conferred priority, and transmits the association request to the AP servicing the determined channel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, preferred embodiments of the present invention will be described in detail with reference to the accompanying drawings.

The present invention has been proposed to improve the completion of 802.11 wireless local area network (WLAN) performance under the circumstances of "hot spot" where many users gather in crowds within a restricted space such as a conference hall, a lecture room, a business center in hotel, and so on. The problem according to the existing channel selection algorithm, in which a system load is not uniformly distributed across the access points (APs), is caused because a mobile station, newly entering a specified basic service set (BSS), does not know the present status of the system load in the hot spot environment. To solve this problem, according to the present invention, the station calculates the network load so as to determine an AP to be accessed.

Figure 1:
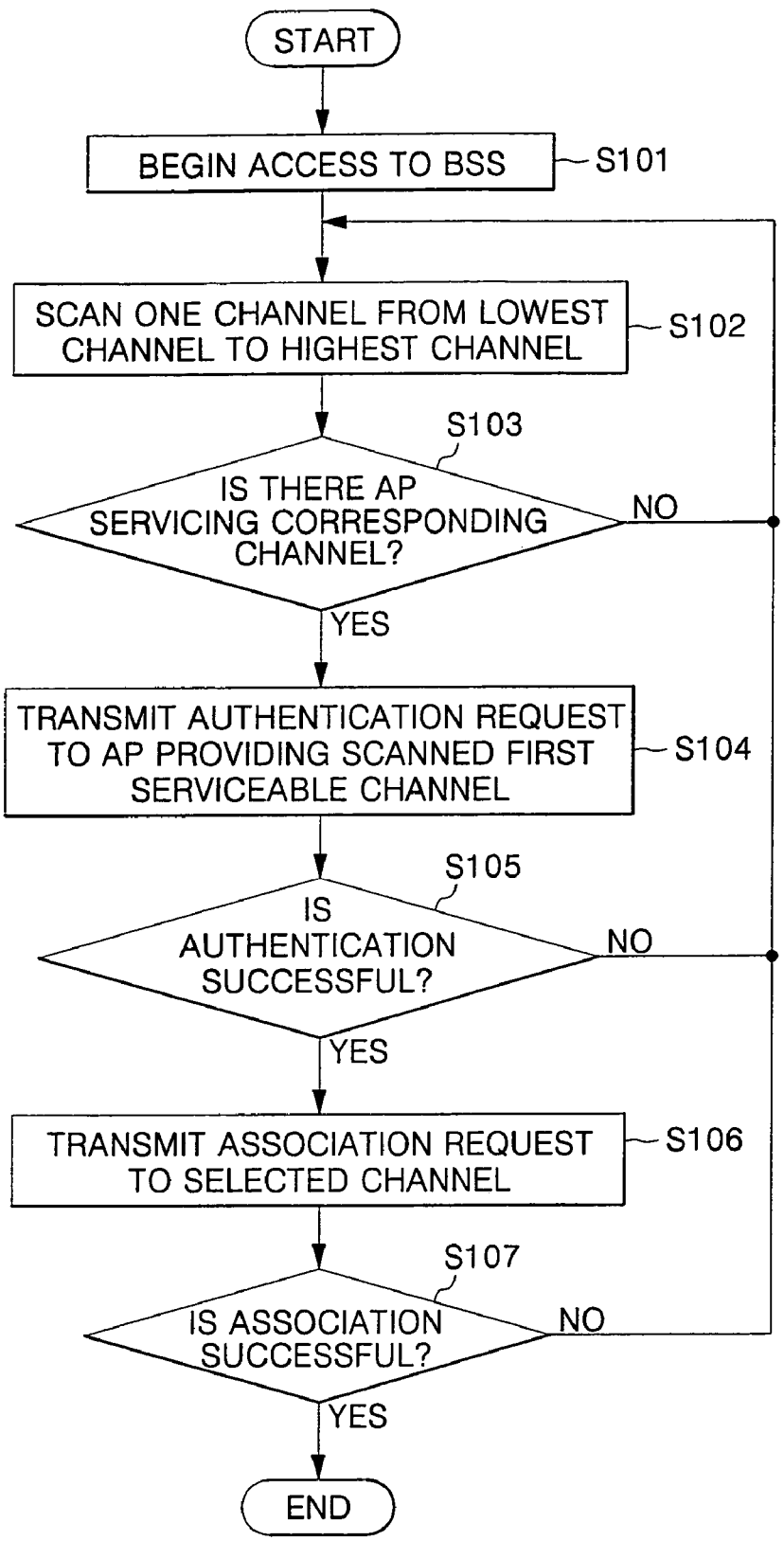
FIG. 1 is a flowchart of a procedure of a basic service set (BSS) of a station in a wireless local area network (WLAN)

FIG. 1 is a flowchart of a procedure of an access to a basic service set (BSS) by a station in a WLAN.

When turned ON from OFF, or when newly entering a WLAN service area, a mobile station begins access to the BSS (S101). In the infrastructure mode, one BSS consists of APs and at least one mobile station communicating with each other. The mobile station scans a plurality of WLAN channels, one by one, from the lower channel to the highest channel (S102). The mobile station checks the channels, one by one, to determine whether or not there is an AP that presently services the corresponding channel (S103). This is performed by obtaining information on the channel being serviced in the respective channels from the beacon frames transmitted at regular intervals from the plurality of APs. If there is an AP servicing a corresponding channel, an authentication request message is transmitted to the AP which is determined to be presently servicing the channel, among the scanned channels, being serviced via the beacon frame transmitted from the AP (S104). If the authentication is successful (Yes in S105), an association request message is transmitted to the corresponding channel (S106). If the association is successful (Yes in S107), the access to BSS in the corresponding mobile station is completed. Steps S102 through S107 are repeated until the mobile station completes a successful access to one channel.

Meanwhile, with respect to the channel-scanning step S102, in addition to the method in FIG. 1 in which the channels are serially scanned from the lower channel to the highest channel, a method may be used in which, among all the channels, a channel with the largest received signal strength indication (RSSI) is selected.

As seen above, the channel selection algorithm scans a given channel set from its lowest channel to its highest channel in such a manner that it selects the fastest channel that is now serviced by an AP, or the channel with highest RSSI by scanning all of the channels. This procedure is implemented whenever a new station has access, and continues until the number of stations exceeds the maximum number that one AP can control so that the corresponding station cannot control more stations. In this case, the next access station is brought over to the AP that services the next channel.

Figure 2:
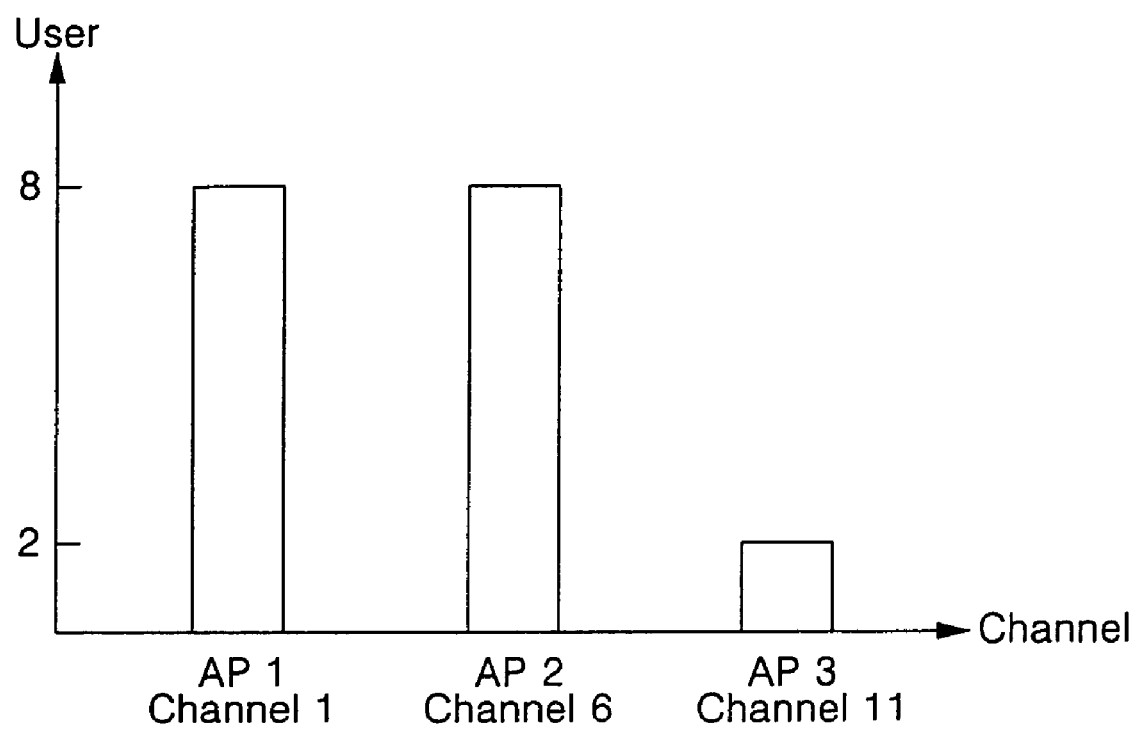
FIG. 2 is a diagram illustrating the number of access stations for each access point (AP) according to a channel selection method.

FIG. 2 is a diagram illustrating the number of access stations for each access point (AP) according to a channel selection method.

In the test of FIG. 2, it is assumed that there are eighteen persons who intend to use WLAN service and three APs in a lecture room. The WLAN system provided in the lecture room follows the 802.11b WLAN standard, and APs 1, 2 and 3 are operated in channels 1, 6 and respectively. The maximum number of persons that the respective APs can control is eight, and the three APs provide the same capacities and signal qualities. In addition, it is assumed that eight persons cause the same qualities of network traffic.

According to the sequential scanning method in which scanning from the lowest channel to the highest channel in the channel selection algorithm of FIG. 1 takes place under the condition, the stations that the eighteen persons use scan the channels in increasing order from channel 1. If there is an AP that services the corresponding channel, the stations try to have access to the corresponding AP. If the corresponding AP accommodates more than the maximum controllable number of persons, the step is brought over to the scanning step for the next channel. That is, under the latter condition, the respective stations try to have first access to the AP1 which is servicing channel 1. When the AP1 is over its capacity, the stations try to have access to the AP2 by moving to the AP2 which is servicing channel 6. When the AP2 is also over its capacity, the stations try to have access to the AP3 while moving to it. Consequently, the stations are allocated to the respective APs with the persons serially filling the APs 1, 2, and 3 to their maximum capacity.

The accommodated persons in each AP are shown in the graph of FIG. 2. Among eighteen persons, eight are allocated to the AP1, another eight persons are allocated to the AP2, and the rest are allocated to the AP3 so as to have access to it. In this case, since the system load is not distributed uniformly over each AP, the users of AP1 or AP2 are to be provided with poor service qualities relative to that provided to the users of AP3.

Figure 3:
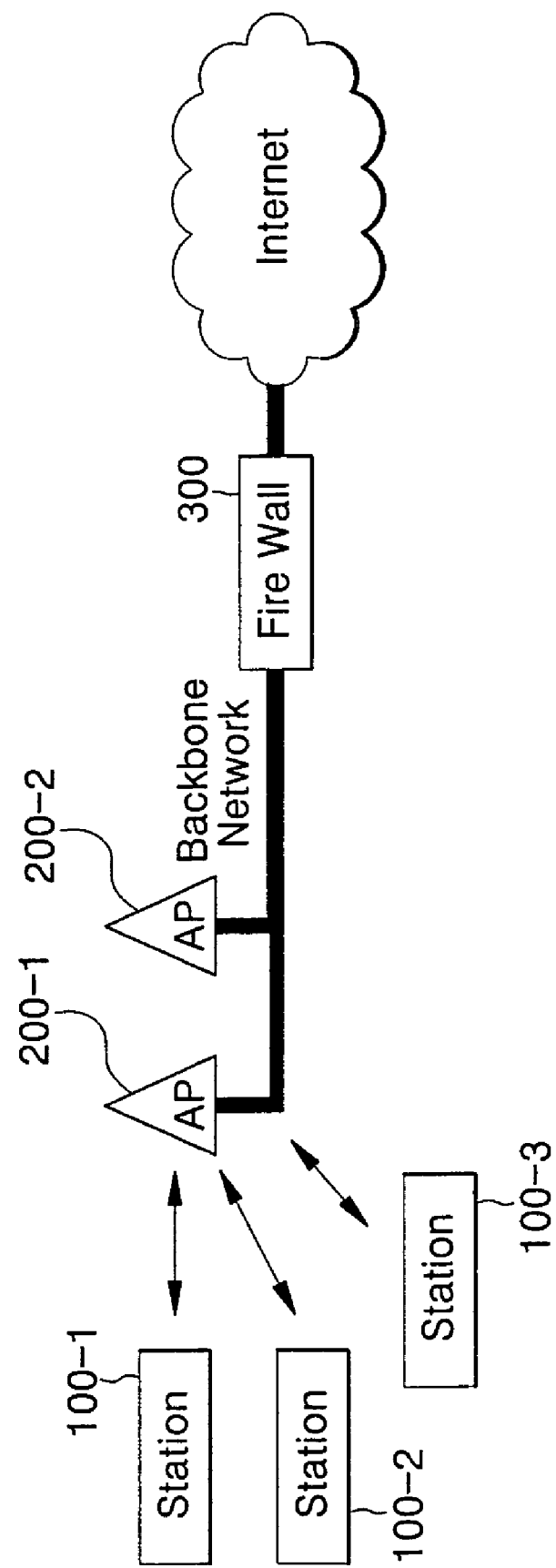
FIG. 3 is a block diagram of a WLAN in an infrastructure mode according to the present invention.

FIG. 3 is a block diagram of a WLAN in an infrastructure mode according to the present invention.

The WLAN of FIG. 3 includes at least one mobile station 100-1, 100-2, and 100-3, at is least one AP200-1 and 200-2, and a firewall 300 for preventing illegal access from exterior.

Under a hot spot environment as in FIG. 3, it is general to provide at least one AP 200-1 and 200-2 for Internet access. Under the circumstances, the coverage of the respective APs is generally overlapped, and the station 100-1, 100-2, or 100-3 has at least one AP 200-1 or 200-2 that it has access to at its position.

The station 100-1, 100-2 or 100-3 selects a usable network to perform an authentication process for the AP 200-1 or 200-2. After the identification between the AP 200-1 or 200-2 and the station 100-1, 100-2 or 100-3, a connection process begins. In the connection process, the AP 200-1 or 200-2 and the station 100-1, 100-2 or 100-3 exchange information and a function with each other. The AP 200-1 or 200-2 can use this information, and shares with another AP 200-1 or 200-2 in the network so as to report the position of a station 100-1, 100-2 or 100-3 in the present network. Only after the completion of the connection process, can the station transmit and receive a frame via the network.

In the case of the WLAN in infrastructure mode as in FIG. 3, the whole network traffic of all the mobile stations in the network reaches the destination on wire or WLAN via AP 200-1 or 200-2. The AP 200-1 or 200-2, and at least one station 100-1, 100-2 or 100-3 AP 200-1 or 200-2, configure one basic service set (BSS) and share one 802.11 radio channel. The WLAN traffic from all wireless mobile stations, i.e., access to network, is controlled by a carrier sense multiple access/collision avoidance (CAMA/CA) algorithm. The stations 100-1, 100-2 and 100-3 check a data transmission status for a constant period before the transmission. The carrier sense section is in charge of this process. The station 100-1, 100-2 or 100-3 must wait a period after the arrangement of the network before the transmission. This 'delayed time' and a 'recipient station', transmitting a confirmation message informing of safe receipt, correspond to a collision avoidance protocol section. In an infrastructure mode, a caller or a recipient always becomes an AP 200-1 or 200-2.

Under the circumstances of FIG. 3, the station 100-1, 100-2 or 100-3 according to the present invention makes a list on channels being serviced from at least one AP 200-1 or 200-2, randomly obtains packets transmitted to the respective channels so as to check Busy Factors for each channel, and provides access priority to each channel according to the Busy Factors by channel. The station 100-1, 100-2 or 100-3 tries to gain access to an AP 200-1 or 200-2 with higher access priority.

At this point, the operation at AP 200-1 or 200-2 is as follows.

The AP 200-1 or 200-2 transmits a beacon frame for channels provided by the AP 200-1 or 200-2 when it is initially driven, in a broadcast mode, that is, setting all stations as a destination. When receiving a probe request from the station 100-1, 100-2 or 100-3 which receives the beacon frame and obtains information on the corresponding AP 200-1 or 200-2, the AP 200-1 or 200-2 transmits a probe response to the corresponding station 100-1, 100-2 or 100-3. When receiving an association request from the station 100-1, 100-2 or 100-3 which receives the probe response, the AP 200-1 or 200-2 should determine whether or not it allows the association request from the corresponding station 100-1, 100-2 or 100-3. At this point, the reference to determine is the number of stations which can be accommodated in the AP 200-1 or 200-2. Since the maximum number of stations accommodated in the AP 200-1 or 200-2 is limited, the AP 200-1 or 200-2 generally predetermines the maximum number of stations accommodated in the AP 200-1 or 200-2 and, if more stations than the limit request association, the AP 200-1 or 200-2 denies the association request.

Generally, a channel selection algorithm may be realized based upon an AP or a station. As seen before, the subject of the channel selection is a station.

A method of the invention will be hereinafter described in detail referring to an operation of a station.

Figure 4:
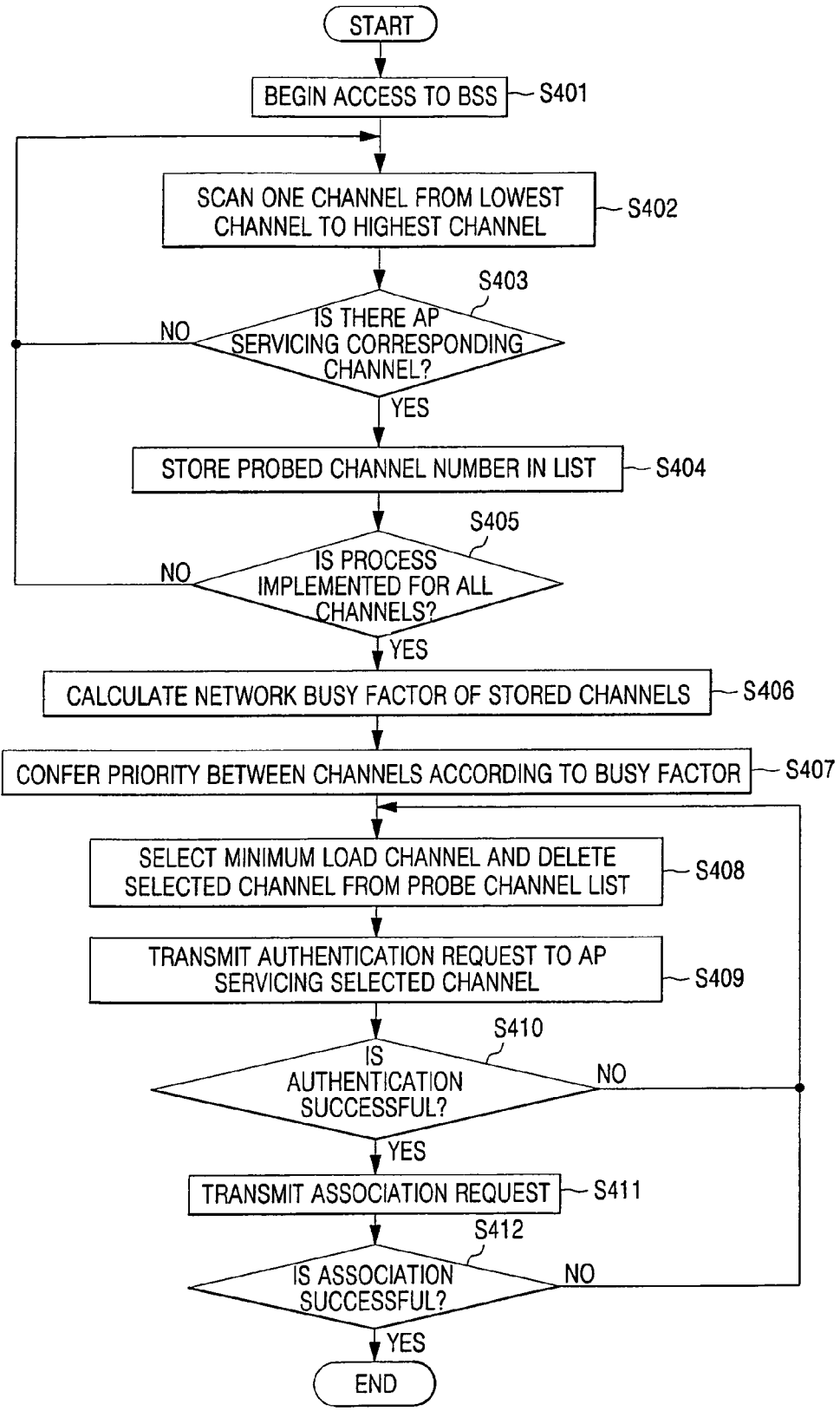
FIG. 4 is a flowchart of a channel selection procedure in a station according to the present invention.

FIG. 4 is a flowchart of a channel selection operation in a station according to the invention.

When a station begins to gain access to BSS (S401), it scans channels one by one from the lowest channel to the highest channel provided in a WLAN(S402). If there is an AP servicing the corresponding channel (Yes in S403), the station stores the number of scanned channels as a list (S404). That is, the channels being serviced by any APs are stored in a probe channel list. By checking to see if the process has been implemented for all channels (S405), steps S402 to S404 are repeated until the respective steps are implemented over all channels serviced by the WLAN. The number of all channels serviced by the WLAN is 11 to 13 according to the regions or countries. The mobile station can obtain a probe channel list including only channels being serviced at its present position.

Network activity of channels stored in the probe channel list is calculated (S406). The network activity can be understood as the amount of network traffic transmitted to the respective channels. That is, it is a standard indicating the extent to which the respective channels are occupied. For the purpose of determining the network activity, a Busy Factor is calculated for the respective channels. The procedure for obtaining the Busy Factor is described in detail below with reference to FIGS. 5 and 6.

When the busy factor is obtained according to the respective channels, a priority between the channels is determined according to the activity (S407). At this point, the channel determined to have the lowest activity is considered as having the highest priority. The lowest activity channel, i.e., the channel having the minimum load, is selected, and the selected channel is deleted from the probe channel list (S408). An authentication request is then transmitted to the AP servicing the selected channel (S409). This process is for the purpose of sequentially implementing the authentication and association to the next order channel if it fails to implement the authentication and association to the channel having minimum load.

If the authentication for the selected channel is successful (Yes in S410), an association request is transmitted to the corresponding AP (S411). If the association is successful (Yes in S412), the channel selection process is terminated. Conversely, if the authentication fails (No in S410), or if the association fails (No in S412), the process returns to step S408 and repeats the authentication and association for the next order channel (S409 to S412).

The channel selection method according to the present invention will now be described in more detail.

Figure 5:
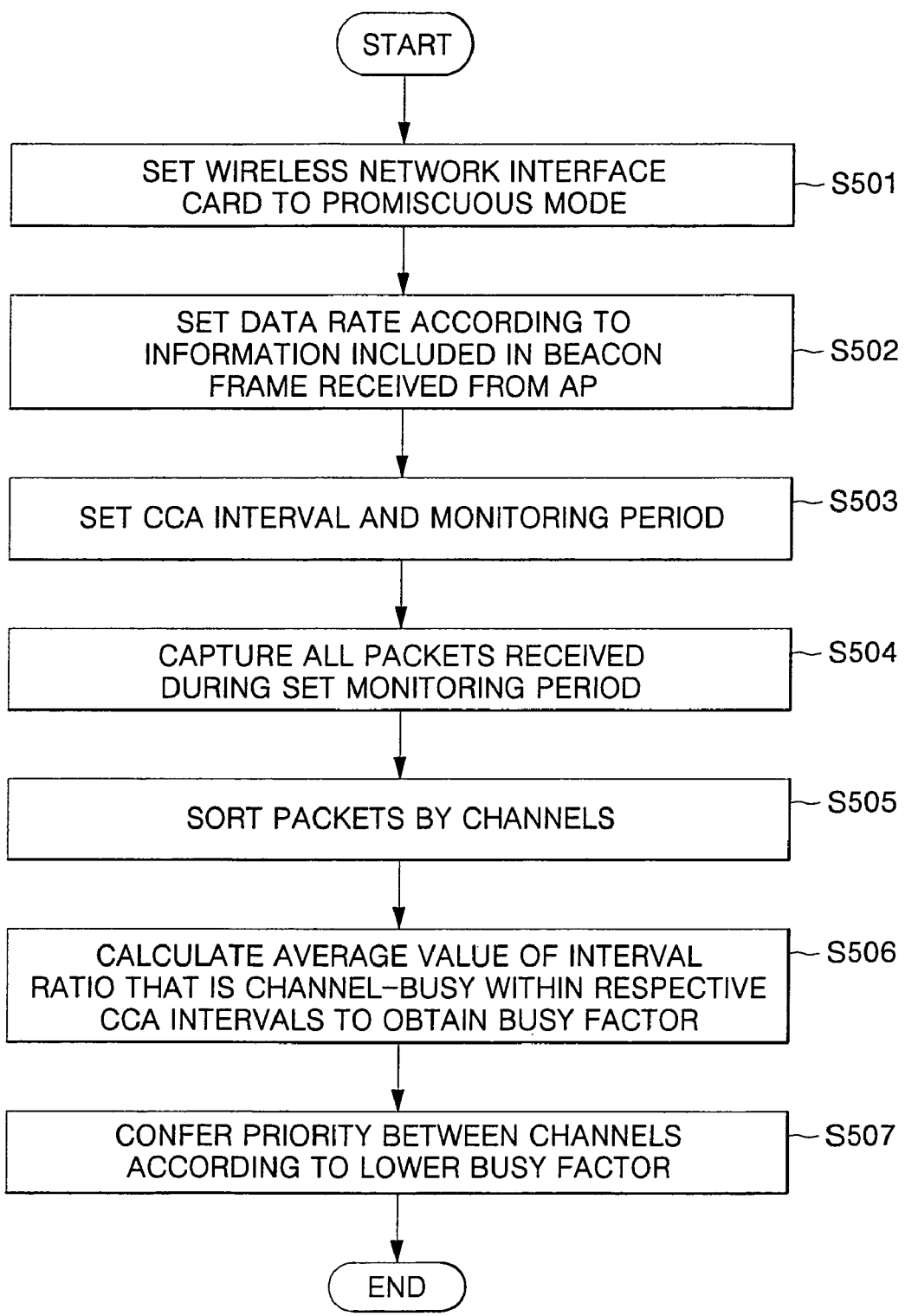
FIG. 5 is a flowchart of a first embodiment of a method for the calculation of channel busy factor of a station and the setting of a priority between channels according to the present invention.

FIG. 5 is a flowchart of a first embodiment of a method for the calculation of the channel busy factor of a station and the setting of a priority between channels according to the invention.

A wireless network interface card of the station is set to a promiscuous mode capable of receiving all packets on the particular radio channel (S501). Generally, in receiving a packet, the packet is selectively received only when the receiver of the corresponding packet is the corresponding device or module. However, if it is set to the promiscuous mode, all packets as detected are received irrespective of the receiver.

The station operating in the promiscuous mode sets a data rate which is supportable depending upon the data rate included in the beacon frame received from the plurality of APs (S502). The beacon frame is a broadcast packet of an AP for maintaining network synchronization. The beacon includes information on a WLAN service area, an AP address, a broadcast destination address, a time stamp, a traffic indicator message (TIM), data rates, and so on. The data rates are the WLAN data rate supported by the IEEE 802.11 standard. If the data rates are 11 Mbps, 6 Mbps, 2 Mbps, and 1 Mbps, although the station has a specification capable of supporting 54 Mbps, the station should set its data rate to 11 Mbps or less because the data rate supported by the AP is at most 11 Mbps.

When the station completes setting of the promiscuous mode and the data rate, a clear channel assessment (CCA) interval$_{CCA\_interval}$ and a monitoring period T$_{monitoring\_period}$ are set (S503). Herein, the CCA can be expressed in terms of a logical function indicative of a wireless medium used state in a physical layer, and CCA equals 1 means that the channel is busy. The CCA checks the state of the channel and reports activity of the corresponding channel if it exists. According to information from the CCA, it is determined when the transmission is interrupted. In the present invention, a time unit for observing an activity of a channel is defined as CCA interval Tcca_interval. A monitoring period is set to determine how many times the observation is repeated during a CCA interval so that the period of time during which the channels transmitted through the wireless medium are observed is determined. Obtaining an average through multiple measurements is employed because a more stable result can be gained by obtaining an average from measurement during some CCA intervals. For example, if the CCA interval is set to 250 ms, and the monitoring period to 1000 ms, an average is obtained from four observations of the CCA interval during the total monitoring period.

After the CCA interval and the monitoring period are set, all packets received during the corresponding monitoring period are captured (S504). The captured packets are sorted according to their respective channels (S505), and an average of the interval ratio during which a channel is busy within the CCA interval is calculated to obtain a Busy Factor by channel (S506).

Herein, the Busy Factor can be expressed by following equation 1:

$$BusyFactor = \frac{T_{cca\_interval}}{T_{monitoring\_period}} \times \sum_{i=0}^{T_{monitoring\_period}/T_{cca\_interval}} \frac{Ti_{cca=1}}{T_{cca\_interval}} \times 100\% \quad \text{Equation 1}$$

In equation 1, T$_{cca\_interval}$ denotes the CCA interval as described above, and T$_{monitoring\_period}$ denotes the total monitoring period. In addition, Ti$_{cca\_interval}$ denotes a time corresponding to the respective CCA intervals, and Ti$_{cca=1}$ means an interval where the CCA equals 1 in the respective CCA intervals, i.e., a time when a channel is busy.

Since the respective CCA intervals are set while being divided by the CCA interval, all CCA intervals have the same time values. The rates of time during which the channel is busy in the respective CCA intervals may differ from each other, so that an average is obtained by taking values in various CCA intervals. Herein, a value obtained by dividing the total monitoring period by the CCA interval becomes the number of CCA intervals included in the total monitoring period.

After the busy factor of the respective channels is calculated, the priority between channels is determined according to the lower busy factor (S507). It has been seen in steps S408 to S412 that an authentication request is transmitted to the AP servicing the higher priority channel based on the determined priority between channels.

Figure 6:
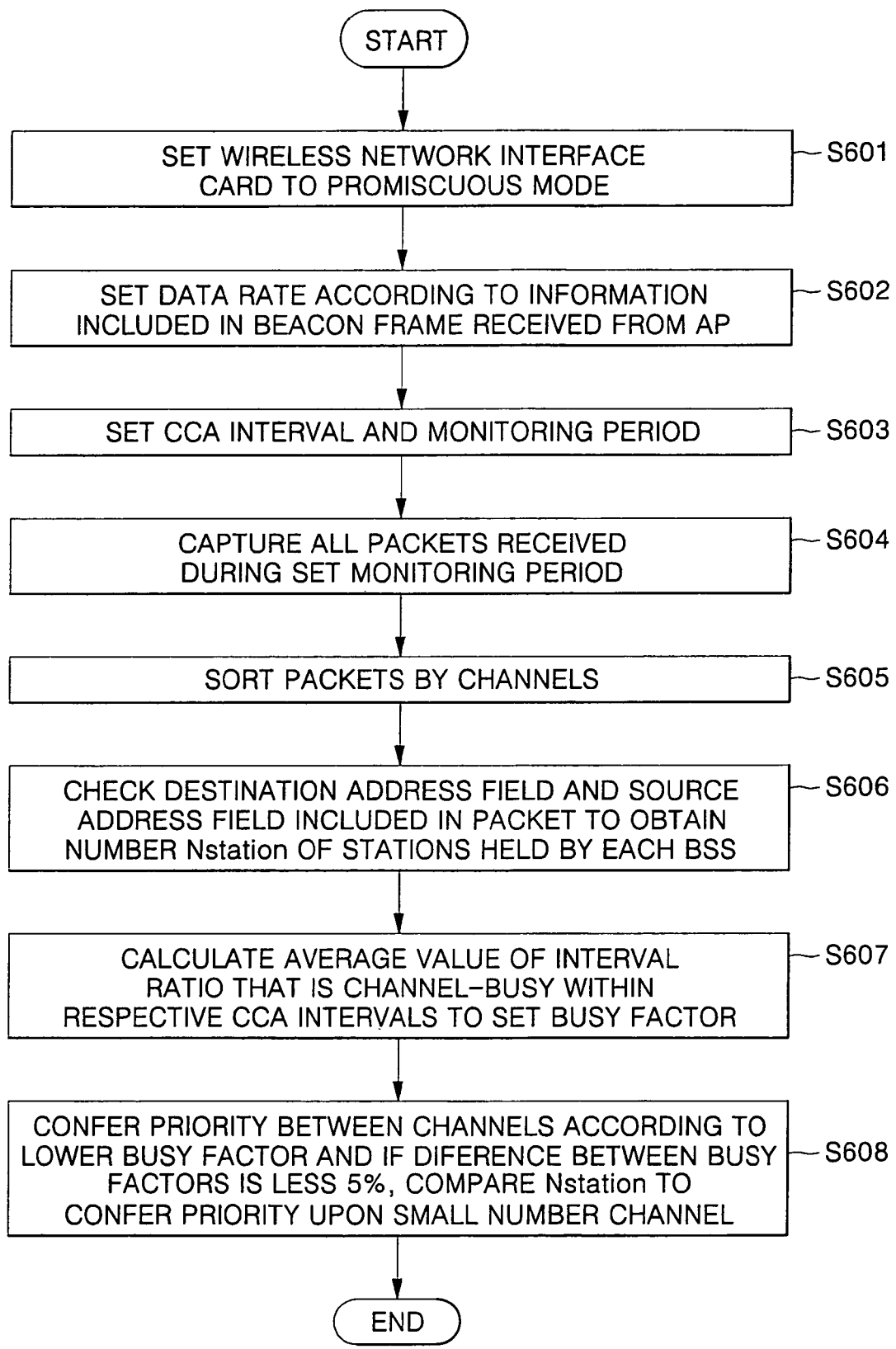
FIG. 6 is a flowchart of a second embodiment of a method for the calculation of channel busy factor of a station and the setting of a priority between channels according to the present invention.

FIG. 6 is a flowchart of a second embodiment of a method for the calculation of the channel busy factor of a station and the setting of a priority between channels according to the present invention.

The second embodiment shown in FIG. 6 has the same basic flow as the first embodiment shown in FIG. 5, but proposes a more complicated method than the first embodiment in determining the priority between channels so as to provide a more precise selection of channel.

Accordingly, the steps of setting the wireless network interface card of a station to a promiscuous mode (S601), setting a data rate according to information included in a beacon frame received from an AP (S602), setting a CCA interval and a total monitoring period (S603), capturing all packets received during set monitoring period (S604), and sorting the captured packets according to channels (S605) are the same as in the first embodiment of FIG. 5.

In FIG. 6, a step S606 is further provided for checking a destination address and a source address field included in the packets by channel so as to calculate the respective basic service sets (BSSs), i.e., the number N$_{station}$ of stations that the respective channels hold. The number of stations that the respective channels hold can be easily obtained by analyzing multicast packets which an AP transmits to all stations accessible to the AP. That is, since the destination address field of the multicast packet transmitted by the AP includes the addresses of all stations accessed to the AP, the number of stations in the corresponding channel can be easily determined by checking the number of addresses in the destination address field. The obtained number N$_{station}$ of stations by channel becomes a standard, with the busy factor, for conferring a priority between channels together.

Step S607 of calculating the busy factor by channel is the same as in the embodiment of FIG. 5. Step S606 of calculating the number of stations which the respective channels hold and step S607 of calculating the busy factor of the respective channels may be inversely or simultaneously implemented.

The method of conferring a priority between channels is implemented in such a manner that priority between channels is first conferred according to the lower busy factor, and if a difference between the particular channels is below 5%, the numbers of stations held by each channel are compared so that a priority is conferred upon the channel with a small number to determine a final priority (S608). Accordingly, in the embodiment of FIG. 6, the priority between channels firstly conferred can be reversed in the final step. In the present embodiment, the difference between the busy factors is set to 5% but is not limited thereto, and it can be set and changed into another value by a system manager according to a system characteristic.

As seen in the above description, the embodiment of FIG. 6 is basically similar to FIG. 5, but it can implement channel selection with a higher completion than in the embodiment of FIG. 5.

Figure 7:
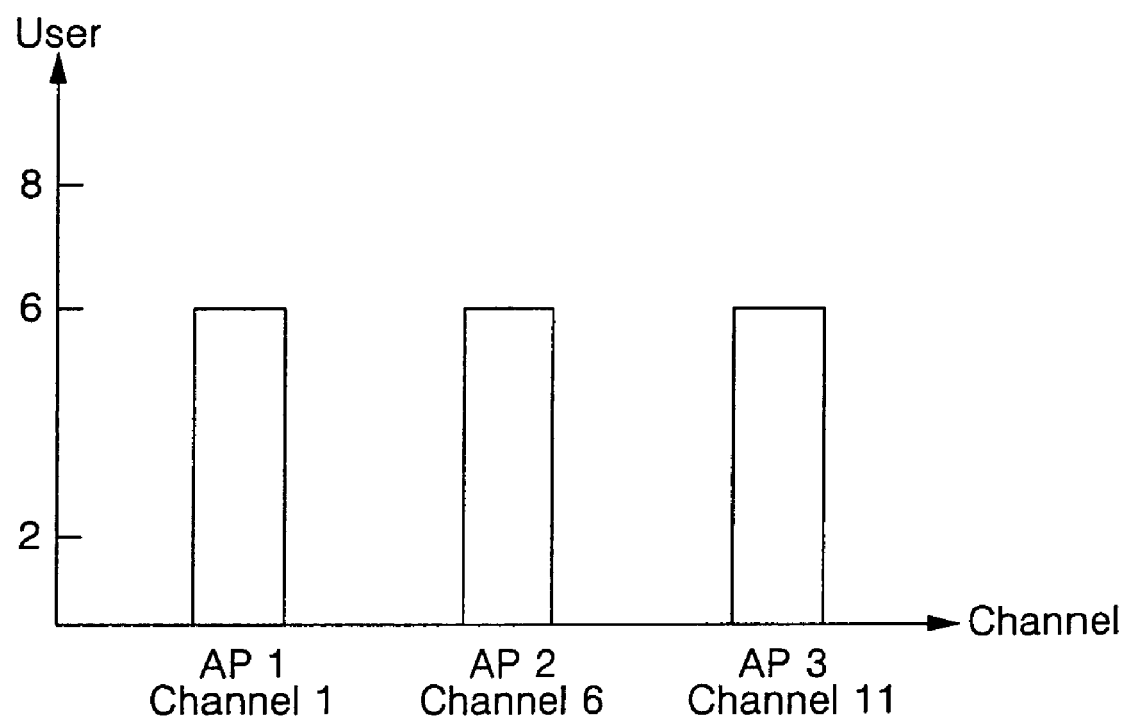
FIG. 7 is a diagram illustrating the number of access stations for each access point (AP) according to a channel selection method of the present invention.

FIG. 7 is a diagram illustrating the number of access stations for each access point (AP) according to a channel selection method of the present invention. It is intended that FIG. 7 show the difference when using the channel selection method of the present invention under the same condition as FIG. 2.

In the test of FIG. 7, similar to that of FIG. 2, it is assumed that there are 18 persons who intend to use WLAN service and 3 APs in a lecture room. The WLAN system provided in the lecture room follows 802.11b WLAN standard, and APs 1, 2 and 3 operate in the channels 1, 6 and 11, respectively. The maximum number of persons which the respective APs can control is eight, and the three APs provide the same capacities and signal quality. In addition, it is assumed that eight persons cause the same qualities of network traffic.

A station newly entering a hot spot environment calculates a busy factor in the respective channels according to a method proposed in FIG. 5 or 6, and selects the channel with the lowest load. Therefore, it can be presumed that the number of stations which each channel holds will be broken up.

The accommodated persons in each AP are shown in the graph of FIG. 3. It can be seen that 18 persons are distributed among the APs so that 6 stations are allocated and accessed to each AP. In this case, since it is assumed that the respective users will cause the same network traffic, the system load is also constantly distributed to each AP.

According to the present invention, the access of a station to a corresponding channel is determined in consideration of the load of each channel so that, in a particular WLAN area, the load on each AP is broken up to improve the quality of the overall WLAN service.

While the invention has been described in conjunction with various embodiments, the invention is not limited to them and, accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A channel selection method of a wireless local area network (WLAN) station, the method comprising:
   capturing, for a determined measuring time, packets from WLAN service channels which are provided by at least one access point (AP) and
   calculating, from the captured packets, busy factors indicative of a load on each WLAN service channel to confer a priority between the WLAN service channels, and selecting a WLAN service channel according to the conferred priority, and
   wherein selecting the WLAN service channel according to the conferred priority comprises:
   sorting the captured packets by WLAN service channel;
   checking, by WLAN service channel, destination address fields and source address fields in the captured packets to calculate a number of stations held by the respective WLAN service channels;
   calculating the busy factors by WLAN service channel from a mean value of an interval ratio which is a channel-busy indicator within each clear channel assessment (CCA) interval in a set monitoring period; and
   conferring the priority between the WLAN service channels according to the calculated busy factors by WLAN service channel in such a way that, if a difference between busy factors is less than a reference value, a priority is conferred upon a WLAN service channel holding less stations by comparing the numbers of stations held by the respective WLAN service channels.

2. The method according to claim 1, wherein capturing packets comprises:
   setting a data rate according to information in a beacon frame received from said at least one AP;
   setting the CCA interval, which is a busy measuring time unit for each WLAN service channel, and setting the monitoring period for repeated measurement; and
   capturing all received packets irrespective of destination addresses in the packets received during the set monitoring period.

3. The method according to claim 1, wherein calculating the number of stations held by the respective WLAN service channels comprises determining a number of destinations in destination address fields of multicast packets transmitted to all stations held by a corresponding AP from APs servicing the respective WLAN service channels.

4. The method according to claim 1, wherein the busy factors are calculated by the following equation:

$$BusyFactor = \frac{T_{cca\_interval}}{T_{monitoring\_period}} \times \sum_{i=0}^{T_{monitoring\_period}/T_{cca\_interval}} \frac{Ti_{cca=1}}{T_{cca\_interval}} \times 100\%$$

where Tcca_interval denotes a CCA interval, Tmonitoring_period denotes the monitoring period, and Ticca=1 means that CCA by respective CCA intervals is 1.

5. The method according to claim 1, further comprising:
   scanning WLAN service channels from a lowest channel to a highest channel in the WLAN; and
   making a probe channel list configured by WLAN service channels being serviced by said at least one AP.

6. The method of claim 5, wherein making a probe channel list comprises:
   saving probed channel numbers in the form of a list when there is an AP servicing a corresponding WLAN service channel; and
   repeatedly checking whether execution for the WLAN service channels serviced by the WLAN is completed until execution is complete for the WLAN service channels.

7. The method according to claim 1, further comprising:
   transmitting an authentication request to said at least one AP servicing the selected WLAN service channel according to the priority conferred between the WLAN service channels; and
   when the authentication request is successful, transmitting an association request to said at least one AP.

8. The method of claim 1, wherein conferring a priority between the WLAN service channels comprises conferring first priority to a WLAN service channel determined to be least busy when busy factors for the WLAN service channels are obtained, and the method of claim 1 further comprising:
   transmitting an authentication request to an AP servicing the WLAN service channel on which the first priority is conferred; and
   deleting a WLAN service channel selected from a probe channel list when transmitting the authentication request.

9. A wireless local area network (WLAN) station configured to capture, for a determined time interval, packets from WLAN service channels provided by at least one access point (AP), to calculate, from the captured packets, busy factors indicative of a load on each WLAN channel so as to confer a priority between the WLAN service channels, and to select a WLAN service channel according to the conferred priority,
   wherein to confer the priority between the WLAN service channels comprises:
   sorting the captured packets by WLAN service channel;
   calculating the busy factors by WLAN service channel from a mean value of interval ratio which is a channel-busy indicator within each clear channel assessment (CCA) interval in a set monitoring period;
   checking, by WLAN service channel, destination address fields and source address fields in the captured packets so as to calculate a number of stations held by respective WLAN service channels; and conferring the priority between the WLAN service channels according to the calculated busy factors by WLAN service channel such that, when a difference between the busy factors is less than a reference value, a priority is conferred upon a WLAN service channel holding less stations by comparing the numbers of stations held by the respective WLAN service channels.

10. The WLAN station according to claim 9, wherein WLAN station is further configured to set the CCA interval, which is a busy measuring time unit for each WLAN service channel, and to set the monitoring period for repeated measurement; and to capture received packets irrespective of destination addresses in the packets received during the set monitoring period.

11. The WLAN station according to claim 9, wherein the busy factors are calculated by the following equation:

$$BusyFactor = \frac{T_{cca\_interval}}{T_{monitoring\_period}} \times \sum_{i=0}^{T_{monitoring\_period}/T_{cca\_interval}} \frac{Ti_{cca=1}}{T_{cca\_interval}} \times 100\%$$

where Tcca_interval denotes a CCA interval, Tmonitoring_period denotes a monitoring period, and Ticca=1 means that CCA by respective CCA intervals is 1.

12. A wireless local area network (WLAN), comprising:
at least one access point (AP) to determine whether to allow an association request according to an accommodation capacity when receiving the association request; and a station to capture, for a monitoring period, packets from the WLAN service channels provided by the at least one, to sort the captured packets by WLAN service channel, to calculate busy factors from a mean value of interval ratio which is a channel-busy indicator within each clear channel assessment (CCA) interval in the monitoring period, to check destination address fields and source address fields in the captured packets so as to calculate a number of stations held by respective WLAN service channels, to confer the priority between the WLAN service channels according to the calculated busy factors by WLAN service channel such that, when a difference between the busy factors is less than a reference value, a priority is conferred upon a WLAN service channel holding less stations by comparing the numbers of stations held by the respective WLAN service channels, to determine an access channel according to the conferred priority, and to transmit the association request to the AP servicing the determined access channel.

* * * * *